US005975815A

United States Patent [19]

Zierpka et al.

[11] Patent Number: 5,975,815

[45] Date of Patent: Nov. 2, 1999

[54] DRILLING TOOL

[75] Inventors: Katrin Zierpka; Eva-Maria Zierpka, both of Karlsruhe, Germany

[73] Assignee: Eva Maria Zierpka, Karlsruhe, Germany

[21] Appl. No.: 08/760,912

[22] Filed: Dec. 6, 1996

[30] Foreign Application Priority Data

| | | | |
|---|---|---|---|
| Dec. 9, 1995 | [DE] | Germany | 195 46 031 |
| Aug. 2, 1996 | [DE] | Germany | 196 31 235 |

[51] Int. Cl.[6] ..... B23B 31/117

[52] U.S. Cl. ..... 408/226; 279/22

[58] Field of Search ..... 7/165, 158; 408/226, 408/240, 239 R, 238; 279/14, 15, 22, 82

[56] References Cited

U.S. PATENT DOCUMENTS

| | | | |
|---|---|---|---|
| 22,524 | 5/1859 | Honneknovel | 7/158 |
| 253,263 | 2/1882 | Bultmann | 408/224 |
| 1,070,425 | 8/1913 | Darling, Jr. | 408/226 |
| 3,136,347 | 6/1964 | Linquist | 408/226 |
| 3,841,646 | 10/1974 | Bennett | 279/14 |
| 4,512,693 | 4/1985 | Swanson | 408/239 R |
| 4,573,839 | 3/1986 | Finnegan | 279/14 |
| 5,013,194 | 5/1991 | Wienhold | 408/240 |
| 5,062,749 | 11/1991 | Sheets | 279/75 |
| 5,470,180 | 11/1995 | Jore | 408/240 |
| 5,586,857 | 12/1996 | Mattern, Jr. et al. | 7/158 |
| 5,651,647 | 7/1997 | Ray | 7/165 |

FOREIGN PATENT DOCUMENTS

| | | |
|---|---|---|
| 2620176 | 11/1976 | Germany . |
| 2660357 | 11/1976 | Germany . |
| 28 22 372 | 11/1979 | Germany . |
| 3008394 | 9/1980 | Germany . |
| 3938244 | 5/1991 | Germany . |

OTHER PUBLICATIONS

Tool and Manufacturing Engineers Handbook; pp. 9–14 – 9–15, May 1984.

*Primary Examiner*—Andrea L. Pitts
*Assistant Examiner*—Adesh Bhargava
*Attorney, Agent, or Firm*—Collard & Roe, P.C.

[57] ABSTRACT

The drilling tool (1) has a drilling segment (4) and a shaft segment (3) with a hexagonal cross section for a torsionally rigid connection with a conventional driving machine. A combination drilling tool having different functional segment on opposite ends thereof for performing two different and sequential work operations.

8 Claims, 3 Drawing Sheets

FIG. 1
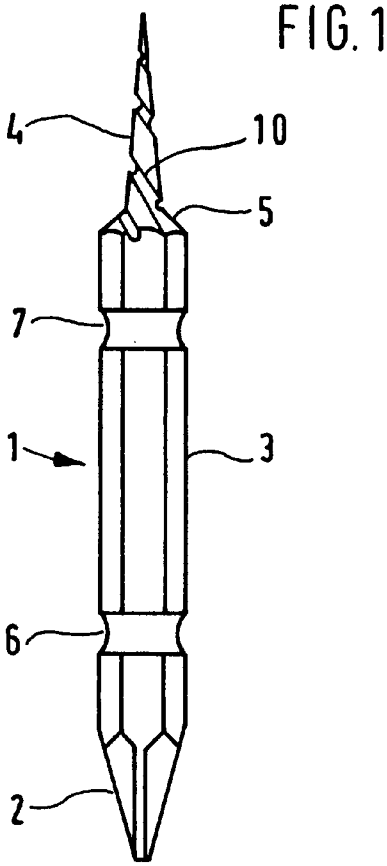
FIG. 2
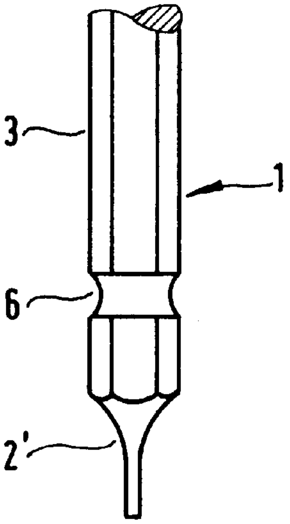
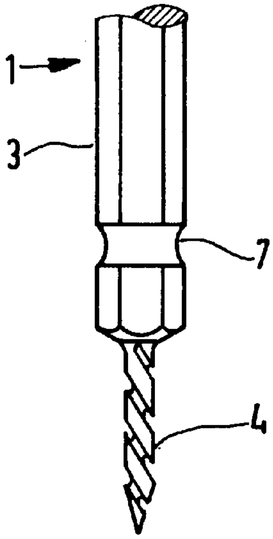
FIG. 3
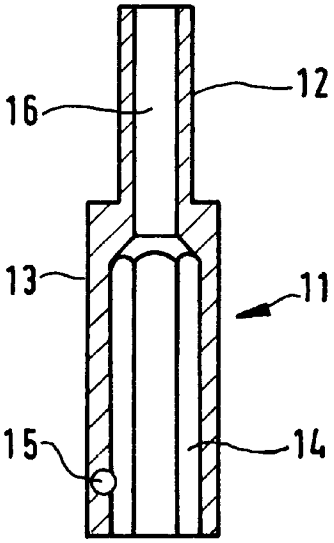
FIG. 4

FIG.6
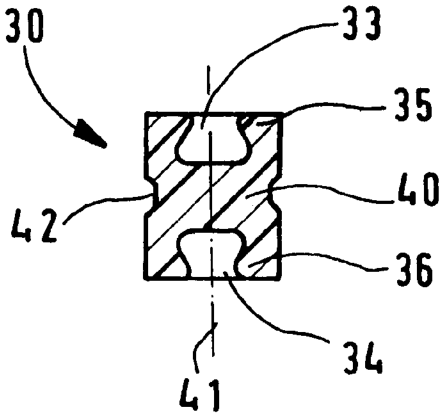
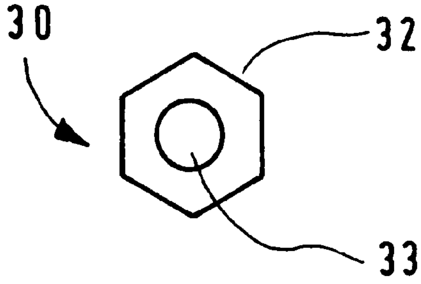
FIG.7
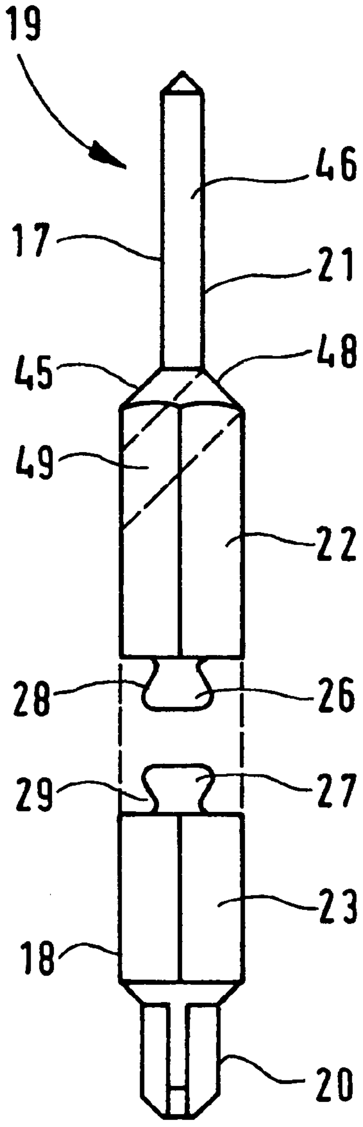
FIG.5

DRILLING TOOL

BACKGROUND OF THE INVENTION

1. Field of the Invention

The present invention relates to tools for drilling and screwing. More particularly, it relates to a combination tool for performing both drilling and screwing work operations.

2. The Prior Art

When working as a professional, or even at the home work level, workpieces consisting of wood or similar materials are generally joined by means of screws or screw-like fasteners. In order to join the pieces together without damaging them, a hole for receiving the screw is first drilled into the workpiece. Even when using so-called self-cutting screws, predrilling of a screw hole is recommended, especially when joining wood workpieces, the quality of the coupling is increased. Furthermore, if the respective screw holes are slightly recessed before the fastening means is screwed in, the fastener can be countersunk into the workpiece. Without a slight chamfering of the screw holes, the workpieces disposed directly near the fastening means can be damaged, or at least become visually impaired.

Screwing tools or reversible drilling machines are increasingly used for facilitating the tightening and loosening of screws or screw-like fasteners. However, it is difficult, and sometimes annoying, to be required to manipulate two or three tools. These tools are generally drills, various screwing tools and, if need be, a sinking tool in order to complete the work operations, which have to be carried out directly one after the other.

For solving this problem, it is proposed in DE-OS 3 938 244 to use a special adapter that enables the user to change between a drill and a screwing tool without having to use the chuck normally used in connection with drilling machines. Accordingly, the published reference describes a quick-change attachment. The disclosed solution facilitates the handling of the drilling machine with some work operations; however, the user continues to be forced to keep several different tools available for carrying out all of the sequential work operations.

It has been proposed in DE-OS 2 620 176, as well as in DE-PS 2 660 357, which is branched from the former, to connect a drilling machine with a displaceable sleeve. The displaceable sleeve can be pushed back such that the drilling insert is released. When pushed forward, the sleeve grips over the head of a screw like a nut, and the respective screw can subsequently be screwed in. As a further development of this solution, DE-OS 3 008 394 describes another screwing sleeve, which also can be operated in connection with a percussion drilling machine.

The aforesaid solutions have drawbacks in that they cannot be applied with conventional drills or screwing tools, but require a special driving machine. The displaceable screwing sleeve solution requires the drilling machine to be permanently equipped with an excessively protruding front attachment which is troublesome in practical use.

SUMMARY OF THE INVENTION

It is an object of the present invention to provide a drilling tool which is especially usable in connection with conventional screwing tools.

It is a further object of the invention to provide a drilling tool that enables different types of work operations to be carried out without requiring two or more tools.

These and other objects are realized by a drilling tool that is torsionally rigidly connected with a driving machine, either directly or by means of an adapter. The drilling tool is manufactured rotation-symmetrically from one piece, and can be distinguished along its longitudinal axis by at least two segments, namely a drilling segment with at least one spiral-shaped chamfer extending all around, and a shaft segment with a hexagonal cross section.

Since the drilling segment is fitted with a hexagonal shaft segment, the drilling tool can be torsionally rigidly joined with the usual coupling sleeves. The drilling tool of the invention enables the predrilling of screw holes to be carried out with the same driving machine as the subsequent screwing in of the fastening means. Accordingly, there is no need to keep a drill and a screwing tool available which may be cumbersome under certain circumstances.

When working with wood workpieces, it is particularly advantageous if a sinking segment is additionally arranged between the shaft segment and the drilling segment. The usual fastening means generally have a head which protrudes radially versus the treaded part and has to be sunk in the workpiece to be worked. When the predrilled hole does not have a slight chamfering near the surface of the workpiece, damage is often caused, or visual impairment of the workpiece within the marginal zone of the screw hole results.

When using the drilling tool according to the invention, the previously mentioned problems are overcome by the fact that slight chamfering of the required screw hole can be additionally performed using the same drilling tool. Furthermore, handling is facilitated by the fact that no additional sinking tool has to be kept available, because such tool is arranged on the drilling tool. Therefore, screw holes can be predrilled and chamfered without having to once put down the driving machine used.

Due to a cone-like tapering of the drilling segment, the drilling tool can be precisely applied to the desired site of the workpiece. In this way, coarsening of the workpiece, which is otherwise required, can often be dispensed with.

The coupling sleeves of conventional driving machines are usually equipped with elastic arresting means that engage matching recesses of the coupled tools. For this reason, a groove is concentrically formed around the entire shaft segment of the drilling tool, such that it is engageable with the arresting means of the driving machine. The groove secures the tool from dropping out of the coupling sleeve. With the groove extending all around, the depth of insertion of the drilling tool into the coupling sleeve of the driving machine is forcibly predetermined to be correct in the given case. This further increases the operational safety of the drilling tool, and further facilitates its handling because the drilling tool is always used with the proper depth of insertion.

According to a further embodiment, the tool can be designed as a combination tool, where a drilling segment is arranged on one end of the shaft segment, and another functional segment for carrying out an additional work operation is arranged on the other end of the shaft segment. Therefore, at least two different work operations can be performed and completed with a single tool. After one work operation has been completed, the combination tool is removed from the coupling sleeve of the driving machine, turned around, and inserted again in the coupling sleeve in a reversed orientation. Thus, there is no longer a need to keep special tools available for each different work operation. Particularly in handling consecutive or directly connected work steps, it is advantageous to have the tool additionally needed for each step to be connected with the other tool. With the combination tool, one tool cannot be lost.

The groove extending all around is associated with each functional segment within the zone of the shaft segment. When using any one of the functional segments, the proper depth of insertion of the combination tool for the given application is predetermined. In addition, the groove secures the tool from dropping out of the coupling sleeve of a driving machine.

The work operations of drilling and screwing can thereby be completed with one single tool. This especially applies when the screw holes would otherwise have to be drilled with an additional drilling tool.

The screwing segment of the combination tool can in each case be exactly adapted to the preferred or given application.

Alternatively, it is also conceivable to combine two drilling segments to form one combination tool. For example, when working with very hard workpieces, it is often necessary to also predrill drilling holes. In such cases, it would be advantageous to be able to complete the work operations of predrilling and drilling with one single tool.

By means of a special adapter, it is also possible to use the combination tool in connection with driving machines that do not have a hexagonal recess for torsionally rigidly connecting such machines with the tool according to the invention. The adapter is fitted with an arresting element which is engageable with the concentrically formed groove (s) of the shaft segment.

In a further embodiment, the hexagonal recess of the adapter includes a receiving well for at least partially receiving the drilling segment or the additional drilling segment. Since the receiving well extends at least partly within the chucking pin, the adapter can be designed shorter overall in the axial direction. The shorter length enhances the handling of a driving machine with the attached adapter because it doesn't project as far when used.

According to another embodiment of the invention, provision is made that at least one arresting element is received in a recess breaking through the jacket of the receiving cylinder. The arresting element is movable between a locking position partially protruding into the hexagonal recess, and a releasing position in which it is retracted versus the hexagonal recess. In order to secure or lock the arresting element in the locking position, provision is made for a locking sleeve. The locking sleeve is arranged on the arresting element and when actuated, can lock or release the arresting element.

When the arresting element is in the locking position, it positively engages the groove of the tool shaft received in the hexagonal recess, and in this way assures axial fixation or alignment of the tool.

The locking sleeve can be a sliding sleeve having an inside radial recess, and that is axially displaceable from a locking position in which the arresting means is locked, to a release position, in which the radial recess is disposed within the zone of the arresting element. When in the release position, the arresting means can yield radially, and is thereby disengaged from the groove extending around the shaft of the tool.

The sliding sleeve is fitted with an inner longitudinal groove having the radial recess arranged on one end. The longitudinal groove is adapted to the contour of the radially projecting section of the arresting element on the outside beyond the receiving cylinder. This is particularly important when using an arresting ball as the arresting element. The arresting ball is supported in the locking position on the sliding sleeve not in a point but in an area. This permits the use of a sliding sleeve made of plastic, which has a light weight as compared to a metallic rotary part, and which can be manufactured simply and at favorable cost.

According to another useful embodiment, provision is made that the radial recess is a bore or perforation breaking through the jacket of the sliding sleeve, and having a cross section equal to or larger than, the arresting element. The radial recess is closed by means of a stopper inserted from the outside. In this way, simple mounting of the adapter is possible in that with suitable adjustment of the sliding sleeve, the arresting element is inserted through the radial recess and the radial recess is subsequently sealed by means of a stopper.

According to yet another embodiment of the invention, the receiving cylinder is provided on the outside with axially spaced arresting recesses, and the sliding sleeve has radially extending elastic pawls which positively engage the respective arresting recess. This assures precise positioning of the sliding sleeve. The arresting recesses and corresponding elastic pawls define the sliding positions of the sliding sleeve, in which the arresting element is locked or released.

The problem of the invention is also solved by a combination tool in which two tools each consisting of a functional segment, for example a drilling segment, and a shaft segment with a hexagonal cross section, are arranged along its longitudinal axis, and can be releasably and securely connected with each other on their shaft segments.

Thus, two separate tools which can be manufactured independently of each other can be joined with each other to form the combination tool. Such an embodiment simplifies the manufacture of such combination tools because individual tools already existing can be combined to form combination tools. Usefully, those tools which are needed for consecutive work steps can be combined.

With the embodiment of the combination tool consisting of two separate tools, it is possible to use different materials for the manufacture of the two tools, or to work such tools in different ways, such as, for example, hardening, in accordance with their respective purpose of application.

An adhesive connection is a simple and favorably priced possibility for joining the two shaft segments with each other.

Another alternative for connecting the two shaft segments is providing the ends of the two shaft segments facing each other with connection sections on which undercuts are arranged for positively cooperating with coupling means. The two shaft segments are connectable with each other by such coupling means.

The coupling means consists of a connection part, which is fitted with coupling recesses oppositely disposed along the same axis. Each of the recesses positively overgrip the undercut of a shaft segment and produce a fixed connection with the tool.

In a particularly advantageous embodiment of the invention, the connection part is made of an elastically deformable material such as plastic. The connection section of the shaft segment provided with the undercut can be inserted in the respective coupling recess by low pressure application and also separated again from the latter. Thus, in the event of damage to one of the tools connected with one other, the damaged tool can be easily removed and repaired or replaced. Furthermore, any desired tool combinations can be assembled in this way.

According to yet another embodiment, the connection part is to be provided with a groove extending entirely around the longitudinally axis of the combination tool. The groove can be engaged in the way described above by the elastic arresting means of a driving machine. The advantage of this design is that no corresponding groove is needed in the shaft segments of the two tools. This makes the manufacture of the tools simpler. Moreover, the entire length of the shaft segment between the functional segment and the connection part can be exploited for receiving the torque of the driving machine.

In addition to the aforementioned tools, screwdriver bits or tap drills can be used as possible functional segments of a tool as well. In addition, one of the tools can be equipped with a sinking segment, by which, for example, drill holes already predrilled can be slightly chamfered.

BRIEF DESCRIPTION OF THE DRAWINGS

Other objects and features of the present invention will become apparent from the following detailed description considered in connection with the accompanying drawing which discloses several embodiments of the present invention. It should be understood, however, that the drawing is designed for the purpose of illustration only and not as a definition of the limits of the invention.

In the drawing, wherein similar reference characters denote similar elements throughout the several views:

FIG. 1 is a plan view of a combination tool according to a first embodiment of the invention;

FIG. 2 is a partial view of a modified combination tool according to the invention;

FIG. 3 is a partial view of a second embodiment of the combination tool according to the invention;

FIG. 4 is a sectional view of an adapter for connecting the combination tool with a chunk of a drilling or screwing machine;

FIG. 5 is a plan view of two tools which are connectable with each other to form the combination tool according to another embodiment of the invention;

FIG. 6 is a cross-sectional view of a connection part according to the invention;

FIG. 7 is a top view of the connection part;

DETAILED DESCRIPTION OF PREFERRED EMBODIMENTS

Figure 8:
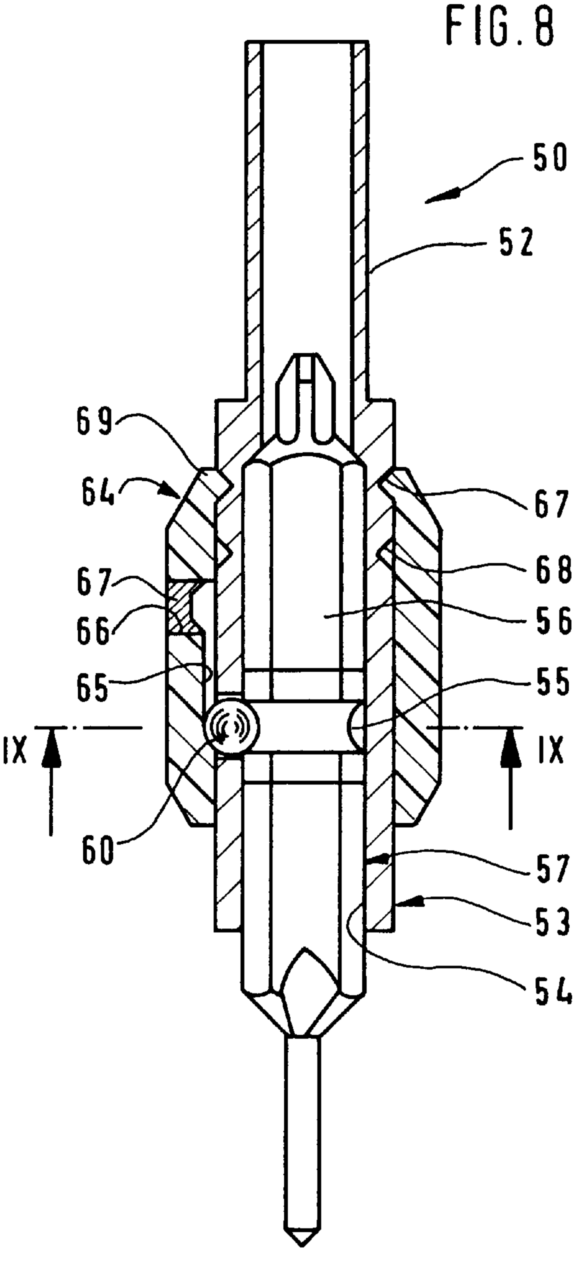
FIG. 8 is a cross-sectional view of a modified adapter with a sliding sleeve according to another embodiment of the invention.

Turning now in detail to the drawings, FIG. 1 shows a rotation-symmetric combination tool 1, which has four distinguishable segments 2, 3, 4, and 5 arranged along its longitudinal axis.

A screwing segment 2 is disposed at one axial end and is connected with a drilling segment 4 via a shaft segment at the other axial end of the combination tool 1. Furthermore, a sinking segment 5 is arranged between shaft segment 3 and drilling segment 4.

The screwing segment 2 is designed as a type of Phillips head tip screwdriver and can also be designed, for example, as a Keystone tip screwdriver 2' (FIG. 2). Screwing segment 2 can be any suitable known type of screwing head.

FIG. 3 shows an example of a combination tool, where no provision is made for a sinking segment 5, and drilling segment 4 is directly connected with shaft segment 3.

Beyond the functional segments 2, 2', 4 and 5 shown in the drawings, many other types of functional segments such as, for example, in the "imbus" or nut form are conceivable as required. The individual functional segments 2, 2', 4 and 5 can be combined in any desired way to form one single combination tool.

For fastening a self-cutting wood screw, the combination tool 1 is connected with a drilling or screwing machine in such a way that the screwing segment 2 or 2' and the shaft segment 3 are at least partly received in a coupling sleeve or in a suitable adapter 11 of a driving machine. An elastic arresting device 15, which is usually present in connection with such coupling devices, engages the concentrically extending groove 7 of the shaft segment 3 such that combination tool 1 is inserted into the coupling device with the proper depth of insertion, and is also secured against falling out. The cone-like design of the drilling segment 4 permits placing the tip of the drilling segment precisely against the respective workpiece and predrilling a required screw hole. In doing so, the screw hole can be slightly chamfered with sinking segment 5.

After the screw hole has been drilled, the desired screw can be inserted in the hole, the combination tool can be turned around, and subsequently inserted again in the coupling sleeve in the reversed way. The correct depth of insertion is again predetermined by the other concentrically extending groove 6 of the shaft segment 3. Combination tool 1 is then positively applied to the screw with the screwing segment 2 or 2', and said screw is subsequently mechanically screwed in with the help of the driving machine. In this operation, the screw head can be sunk completely without any problem because the respective screw hole was already chamfered. A torsionally rigid connection between the coupling sleeve of the driving machine and combination tool 1 is established by the hexagonal profile of shaft segment 3.

FIG. 4 shows an adapter 11 for joining combination tool 1 with a commonly used chuck of a drilling or screwing machine. Adapter 11 has a cylindrical clamping pin 12, which can be torsionally rigidly connected with such a chuck. In the opposite end of clamping pin 12, adapter 11 is provided with a receiving cylinder 13 having a concentric hexagonal recess 14 for receiving the functional segment 2, 2' or 4 not required at the given time, and part of the shaft segment 3.

Hexagonal recess 14 establishes a torsionally rigid connection of the adapter 11 with the combination tool 1. Recess 14 opens out into a conical aperture (not shown) within the receiving cylinder 13 for occasionally receiving the drilling segment 4. This permits reducing the overall length of adapter piece 11. Adapter 11 can be additionally fitted with the arresting means 15, which can be brought into interaction with the grooves 6 or 7 extending all around. With adapter 11, combination tool 1 can be used in connection with those drilling and screwing machines having a chuck not intended for receiving hexagonal profiles.

The two tools 17, 18 of the combination tool 19 shown in FIG. 5, each have a functional segment 20, 21, as well as a shaft segment 23, 22, respectively, with a hexagonal cross section. At the ends facing one another, shaft segments 22, 23 each have mushroom-shaped coupling sections 26, 27 with the undercuts 28, 29, respectively, for positively engaging a connecting part 30 (FIGS. 6 and 7).

The connecting part 30 consists of an elastically deformable material, such as, for example, plastic, and has a hexagonal cross section 32, which, when used as intended, is aligned with shaft segments 22, 23 of the tools 17, 18, respectively. At the ends of connecting part 30 facing the shaft segments 22, 23, concentric recesses 33, 34 are arranged, which are limited by bead-like outer sections 35, 36, respectively. A groove 42 is cut into the center section 40 of the connection part 30 and extends entirely around longitudinal axis 41.

When combination tool 19 is assembled, the two tools 17, 18 are pressed with their mushroom-like coupling sections 26, 27 into the recesses 33, 34, respectively, of connecting part 30. In this process, the bead-like outer sections 35, 36 are briefly stressed radially and subsequently positively engage the undercuts 28, 29 of the tools 17, 18, respectively. After coupling sections 26, 27 of tools 17, 18 have been pressed into the recesses 33, 34, respectively, tools 17, 18 are solidly joined with each other. When combination tool 19 is used as intended, the arresting means 15 of adapter 11 engages groove 42.

The combination tool 19 consists of a drilling tool 21 fitted with a sinking segment 45 and a drilling bit 46, as well as of a Phillips head tip screwdriver 20. A blade 48 is arranged on sinking segment 45 at an angle of 45° relative to the longitudinal axis of the combination tool 19. Blade 48 is adjoined by a chip duct 49 extending perpendicularly to said blade.

When used as intended, combination tool 19 is joined in the same way as combination tool 1 with a drilling or screwing machine, or with a suitable adapter 11 for drilling a screw hole. The bore drilled by the drilling bit 46 in the workpiece is chamfered by the cutter 48. The chips collected in this process are discharged via the chip duct 45. After the drilling operation has been completed, combination tool 19 is separated from the coupling sleeve of the drilling or screwing machine and inserted again in the reverse configuration. Subsequently, a countersunk head screw inserted in the predrilled hole can be screwed in by means of the Phillips head tip screwdriver 20.

Figure 9:
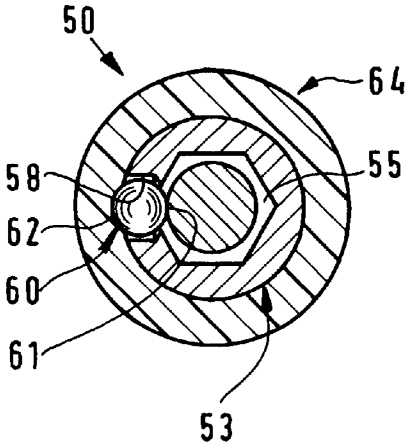
FIG. 9 is a cross-sectional view of the adapter and the tool of FIG. 8, taken along line IX—IX.

The adapter 59 shown in FIGS. 8 and 9 has a clamping pin 52, which can be torsionally rigidly coupled with a chuck of a drilling or screwing machine. A receiving cylinder 53 is coaxially coupled with clamping pin 52 and has a hexagonal recess 54 for receiving the shaft of a tool 57, such shaft being provided with a groove 55 extending all around. An arresting ball 60 is received in a recess 58 breaking through the jacket of receiving cylinder 53. Arresting ball 60 serves as the arresting element which, in the locking position shown, positively engages groove 55 of the tool shaft 56 with a cap-like section 61 projecting into the hexagonal recess 54. In the locking position, arresting ball 60 radially projects beyond receiving cylinder 53 with cap-like shaped section 62. The recess 58 breaks through the jacket of receiving cylinder 53 is stepped and, on the side pointing at the hexagonal recess 54, has a diameter smaller than the diameter of the arresting ball 60. In this way, when tool 57 is decoupled, the arresting ball 60 is kept in the recess 58 such that only a cap-like section 61 projects into the hexagonal recess 54.

Radially on the outer side, a sliding sleeve 64 made of plastic is received on the receiving cylinder 53. Sleeve 64 has an inner longitudinal groove 65 and at its one end a radial recess 66 in the form of a bore. Radial recess 66 breaks through the sleeve jacket and is closed by means of a stopper 67 inserted from the outside. The longitudinal groove 65 is adapted to the cap-like section 61 of arresting ball 60. The cap-like section 61 projects into the locking position beyond the receiving cylinder, and thus provides support for the arresting ball 60. In the releasing position, sliding sleeve 64 is axially displaced such that radial recess 66 is disposed above the arresting ball 60 and thus permits the ball to yield, and be disengaged from groove 55.

The radial recess 66 designed as a bore in the jacket of the sliding sleeve 64 and has a diameter larger than that of arresting ball 60. Thus, with appropriate adjustment of the sliding sleeve 64, arresting ball 60 is insertable through said bore into recess 58 of the jacket of the receiving cylinder 53. Subsequently, only closing of the bore from the outside by a stopper 67 is still required.

Furthermore, on the side of clamping pin 52, receiving cylinder 53 is radially provided on the outside with axially spaced arresting recesses 70, 68 that are spaced in accordance with the longitudinal expanse of inner groove 65 of the sliding sleeve 64. Sliding sleeve 64 has radially elastic pawls 69 which, in the locking position the releasing position of the arresting ball 60, engage the arresting recesses 70 and 68, respectively, of receiving cylinder 53.

While several embodiments of the present invention have been shown and described, it is to be understood that many changes and modifications may be made thereunto without departing from the spirit and scope of the invention as defined in the appended claims.

What is claimed is:

1. A combination tool which is connectable with torsional strength with a driving machine comprising:

a) a first tool having a functional segment and a shaft segment with a hexagonal cross section, said shaft segment having one end coupled to said functional segment and an opposite end, said first tool having a longitudinal axis;

b) a second tool having a functional segment and a shaft segment with a hexagonal cross section, said shaft segment having one end coupled to said functional segment and an opposite end, said second tool having a longitudinal axis;

c) coupling means for connecting said first and second tools with each other along their respective shaft segments and said longitudinal axes wherein there is at least one groove extending entirely around at least one of said shaft segments on either said first tool or said second tool;

d) an adapter for receiving said first and said second tool in a hexagonal recess so that the torque is directly transmitted between the adapter of the driving machine and the shaft segments said adapter comprising:

i) a clamping pin for a torsionally rigid connection with a chuck of a driving machine;

ii) a receiving cylinder having a hexagonal recess extending concentrically with respect to an axis of rotation of the adaptor, and extending at least partly into the clamping pin, said receiving cylinder for at least partly receiving said first and said second tools; and e) an arresting element for engaging and locking with said groove, said arresting element elastically protruding within a zone of the hexagonal recess.

2. A combination tool which is connectable with torsional strength with a driving machine comprising:

a) a first tool having a functional segment and a shaft segment with a hexagonal cross section, said shaft segment having one end coupled to said functional segment and an opposite end, said first tool having a longitudinal axis;

b) a second tool having a functional segment and a shaft segment with a hexagonal cross section, said shaft segment having one end coupled to said functional segment and an opposite end, said second tool having a longitudinal axis;

c) coupling means for connecting said first and second tools with each other along their respective shaft segments and said longitudinal axes wherein there is at least one groove extending entirely around said shaft segment;

e) an adapter for receiving said first and said second tool in a hexagonal recess so that the torque is directly transmitted between the adapter of the driving machine and the shaft segments said adaptor further comprising:

i) a clamping pin for a torsionally rigid connection with a chuck of a driving machine; and ii) a receiving cylinder having a concentric hexagonal recess for at least partly receiving at least one of said shaft segments and said cylinder having an inner and outer surface and a recess extending from the inner surface to the outer surface;

f) an arresting element disposed within said recess and being movable between a locking position defined by projecting said element beyond said inner surface into said hexagonal recess and a release position defined by retracting said element from said recess; and g) a locking sleeve having an inner groove extending along a longitudinal axis adapted to the contour of a portion of said arresting element and having a radial recess disposed at one end of said longitudinal axis wherein said locking sleeve is an axially displaceable sliding sleeve being slidable along the outer surface of said receiving cylinder wherein said radial recess aligns with said arresting element when said sliding sleeve is disposed in the release position said radial recess enabling said arresting element to protrude beyond said outer surface of said receiving cylinder and thereby release said arresting element from said hexagonal recess.

3. The combination tool according to claim 2, wherein said radial recess is a bore through said sliding sleeve and further comprising a stopper for closing said bore from the outside, said bore having a diameter equal to or larger than said arresting element.

4. The combination tool according to claim 2, wherein said receiving cylinder further comprises an axially spaced arresting recess disposed on the outer surface, and said sliding sleeve further comprises radially extending elastic pawls for positively engaging said arresting recess and securing said sliding sleeve in one of said two operable positions.

5. A combination tool which is connectable with torsional strength with a driving machine comprising:

a) a first tool extending along a longitudinal axis and having a functional segment and a shaft segment with a hexagonal cross section, said shaft segment having one end coupled to said functional segment and an opposite end, having an undercut;

b) a second tool extending along a longitudinal axis and having a functional segment and a shaft segment with a hexagonal cross section, said shaft segment having one end coupled to said functional segment and an opposite end, having an undercut;

c) coupling means for connecting said first and second tools with each other along their respective shaft segments and longitudinal axis wherein said coupling means comprises connection sections disposed on said opposite ends of said shaft segments and a connector for positively engaging said undercuts of said connection segments; and d) an adapter for receiving said first and said second tool in a hexagonal recess so that a torque is directly transmitted between the adapter of the driving machine and the shaft segments.

6. A combination tool according to claim 5, wherein said connector comprises a connecting part having a longitudinal axis and axially opposed recesses for receiving and engaging said undercuts of said connection segments.

7. A combination tool according to claim 6, wherein said connecting part comprises an elastically deformable material.

8. A combination tool according to claim 7, wherein said connecting part further comprises a groove extending entirely around the longitudinal axis.

* * * * *